Jan. 16, 1923.
E. M. VanDYKE.
BOLT.
FILED DEC. 2, 1919.
1,442,500
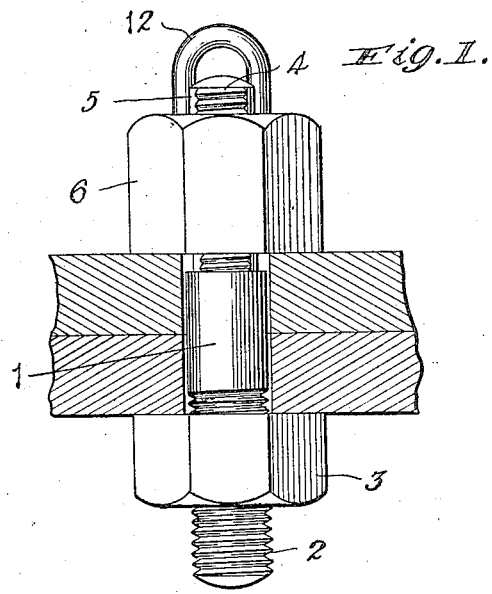
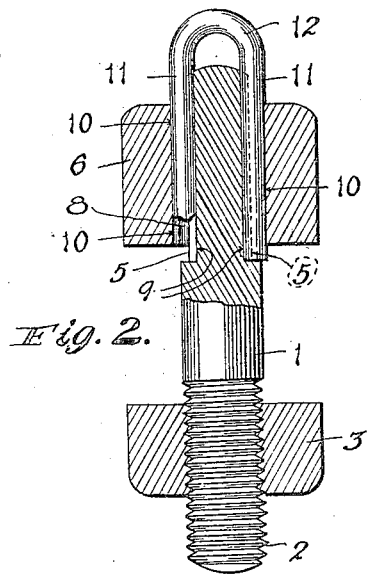
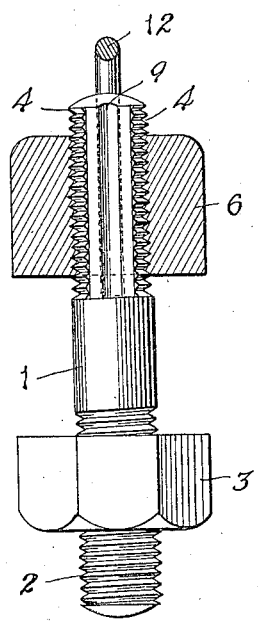
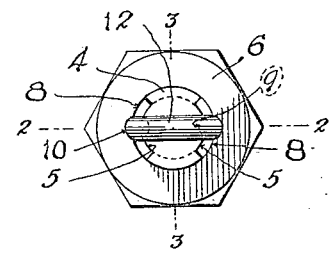
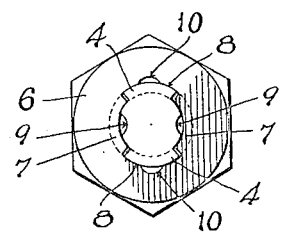
INVENTOR:
Elmer M. Van Dyke,
BY
Russell M. Everett,
ATTORNEY.

Patented Jan. 16, 1923.

1,442,500

UNITED STATES PATENT OFFICE.

ELMER M. VAN DYKE, OF LYNDHURST, NEW JERSEY, ASSIGNOR TO MATHIAS-VAN DYKE COMPANY, OF TRENTON, NEW JERSEY, A PARTNERSHIP COMPOSED OF SAID VAN DYKE AND HERBERT J. MATHIAS.

BOLT.

Application filed December 2, 1919. Serial No. 341,858.

*To all whom it may concern:*

Be it known that I, ELMER M. VAN DYKE, a citizen of the United States, and a resident of Lyndhurst, in the county of Bergen and State of New Jersey, have invented new and useful Improvements in Bolts, of which the following is a specification.

This invention relates to quick releasable heads or nuts of bolts, such as setting-up bolts which are employed temporarily for holding work which is to be permanently riveted, such as in ship building, structural iron work, and so forth, and I have illustrated the invention as applied to a setting-up bolt, although obviously it can be applied to any kind of a bolt or equivalent device.

The objects of the invention are to lock the head or nut against release or turning in either direction in such a way as to prevent injury to the ribs, threads or other engaging means by efforts to turn the bolt and head or nut relatively to each other when so locked; to accomplish this by providing a bolt and head having cooperating longitudinal recesses or grooves with other and further longitudinal recesses or grooves formed in the bottoms of said first-mentioned recesses or grooves and each spaced from the side edges of said bottoms; to thus insure that when a locking key is inserted in such second or further longitudinal recesses or grooves it shall be spaced from the ends of the segmental ribs or threads, so that when relative turning of the head or nut upon its bolt is attempted none of the strain is brought upon said ends of the ribs or threads; to thus avoid mutilation of said ends of the ribs or threads, such as would prevent ready interlocking of said ribs or threads, and thus retain the device in working condition for a longer period; to facilitate the construction and use of such locking means, and to obtain other advantages and results as may be brought out in the following description.

Referring to the accompanying drawings, in which like numerals of reference indicate the same parts throughout the several views, Figure 1 is a side elevation of a setting-up bolt embodying my invention;

Figure 2 is a vertical sectional view through the same on the line 2—2 of Fig. 4, an end portion of one arm of the key being broken away for greater clearness;

Figure 3 is a similar view on the line 3—3 of Fig. 4, the shank of the bolt being shown in side elevation;

Figure 4 is a top plan view of the head in locked position, and

Figure 5 is a top plan view of the head in position to be slid longitudinally of the shank.

Specifically describing the present embodiment of the invention, the numeral 1 designates the shank of my improved bolt, said shank having one end thereof screw-threaded, as at 2, to receive a conventional adjustable nut 3. The opposite end of said shank is provided with circumferential ribs 4, portions of said ribs being cut away at opposite sides of the shank 1 and longitudinally thereof to form smooth releasing channels 5 for the purpose of quick sliding detachment of the head 6 longitudinally of the shank. The channels 5 are of a width equal substantially to one-quarter of the circumference of the shank and of a depth substantially equal to the height of the ribs 4.

The head 6 is circumferentially ribbed at 7 correspondingly to the ribs 4 of the shank, and has portions of its ribs cut away at opposite sides thereof, as at 8, to form releasing channels similar to the channels 5 of the shank 1. These channels 8 are of a width substantially equal to one-quarter of the inner periphery of the head and of a depth about equal to the height of the ribs, so as to loosely receive the ribbed portions 4 of the shank and slip over the same to allow sliding of the head 6 longitudinally of the shank 1, the channels 5 of the shank being adapted to receive at the same time and in a similar manner the ribs 7 of the head. Both the channels 5 and 8 of the shank 1 and head 6 are provided substantially centrally thereof with complemental key-grooves 9 and 10 respectively, adapted to receive the arms 11 of a U-shaped key 12, preferably formed of round wire or rod, for locking the head 6 on the shank.

In the operation of the device, the head 6 serves in a manner similar to the solid head of a conventional bolt, being slipped onto the shank 1 with its segmental ribs 7 sliding in the channels of the shank and with its channels 8 receiving and sliding over the segmental ribs 4 of the shank, as shown by Figure 5. The head 6 is then given a quarter turn to cause engagement of the ribs 7 and 4 of the head and shank to prevent further longitudinal movement of the head on the shank as shown by Figure 4. This action brings the key-grooves 9 and 10 into registry to form keyways into each of which one arm of the key 12 is inserted with the key straddling the shank, as shown in Figures 2, 3 and 5. The key thus prevents further rotation of the head on the shank. The shank can then be inserted through bolt openings in the members to be fastened together, and the adjusting nut 3 tightened to hold the said members between itself and the head 6 in the usual manner.

In removing the bolt from the bolt openings, the key 12 is pulled out of the keyways and the head rotated a quarter turn, after which it can be quickly slid longitudinally off the shank by means of the guideways 5 and 8, as before described. The shank can then be pushed out of the bolt openings, if it is desired to insert a rivet as is customary in ship-building or structural iron work. When the bolt is applied to clamping or bolting two pieces of material together the tightening of the nut 3 puts the material under compression and when the head 6 is rotated or unscrewed a quarter of a turn it immediately moves away from the material clamped, and when the guideways 5 and 8 register with the ribs 7 and 4 the spring of the material automatically forces the head 6 longitudinally of the shank to quickly release the head 6 from the shank and the work. The quick detachable head 6 eliminates the waste of time incident to unscrewing the conventional nut, as is now the common practice, and furthermore enables the bolt to be released at the opposite side of the work from that at which the nut has been applied, as is very desirable in ship-building to save the time of the riveter. In applying the bolts, it is often necessary to hold the head while the adjusting nut is being tightened to prevent turning of the shank, and the two arms of the key 12 provide efficient locking means to prevent slipping of the head under such conditions. Furthermore, the arrangement of the keyways at a distance from the ends of the segmental ribs 4 and 7 of the shank and head prevent contact of the key with said ribs and mutilation or injury to them when the head 6 is put under strain of attempted rotation. The key 12 is conveniently and inexpensively formed of round wire or rod, and the loop thereof between the arms provides a convenient grip for removing the key. To compensate for the ribs being partially cut away on the shank 1 and head 6 the head is made long enough to produce the necessary extent of engagement to prevent stripping. Preferably the cooperating circumferential ribs on the shank and head are screw threads, as shown, but this is not necessary and various other modifications can be made without departing from the spirit and scope of the invention, as will be understood.

The key 12 is preferably longer than the grooves 9 and 10 which receive it in locked position of the head, so that the bend or closed end of the key projects sufficiently beyond the end of the shank to provide an opening for the convenient insertion of a tool to pull out the key preparatory to releasing the head. Furthermore, it will be noted that when the head is in locked position the circumferentially ribbed portions 4 of the shank lie in front of the key grooves 9 and 10, and this is of utility in the following way: Bolts of this sort are usually dipped in oil before being used, and the key grooves in the position just described become filled with the heavy oil which later gradually seeps out through the engaging threads of the shank and head. This greatly lessens liability of the head becoming rusted upon the shank to such an extent that it cannot be released readily or without damaging it, and thus conduces to long life and easy manipulation of my improved bolt.

Having thus described the invention, what I claim is:

1. In a bolt, the combination with a shank having an end portion provided with circumferential ribs, a removable annular head having interior ribs adapted to cooperate with and enter between the ribs of the shank, said ribs being cut away on both shank and head for opposite longitudinal portions thereof so that when the ribbed longitudinal portion of one is brought opposite the cut-away longitudinal portion of the other the head is free to move longitudinally of the shank, one of said cut-away portions on the head and one on the shank each having at a distance from its said side edges a longitudinal groove or recess, and a locking member adapted to be inserted in said grooves or recesses when they register and be spaced thereby from the ends of the circumferential ribs.

2. In a bolt, the combination with a shank having an end portion provided with circumferential ribs, a removable annular head having interior ribs adapted to cooperate with and enter between the ribs of the shank, said ribs being cut away on both shank and head for opposite longitudinal portions thereof so that when the ribbed longitudinal portion of one is brought opposite the cut-away longitudinal portion of the other the head is free to move longitudinally of the shank, one of said cut-away portions on the head and one on the shank each having at a distance from its said side edges a longitudinal groove or recess, and a locking member longer than said grooves or recesses so as to project therefrom and having at its projecting end means for withdrawal spaced from the end of the bolt.

3. In a bolt, the combination with a shank having an end portion provided with circumferential ribs, a removable annular head having interior ribs adapted to cooperate and enter between the ribs of the shank, said ribs being cut away on both shank and head for opposite longitudinal portions thereof so that when the ribbed longitudinal portion of one is brought opposite the cut-away longitudinal portion of the other the head is free to move longitudinally of the shank, cut-away portions on the head and shank having each at a distance from its side edges, opposite longitudinal recesses, and a U-shaped locking member adapted to be inserted in said recesses to prevent relative turning of the head and shank, said locking member being longer than said recesses and having its outer end spaced from the bolt and to provide a hole for removal.

4. In a bolt, the combination of a shank having an end portion thereof provided with a pair of alined circumferential grooves upon opposite sides of said shank and longitudinally extending channels between the ends of said grooves, and a head provided with a pair of circumferential ribs adapted to engage said grooves to hold the nut against longitudinal movement upon said shank, said ribs being separated by longitudinal channels corresponding to the channels in the said shank and the said ribs on the head and grooves in the shank registering respectively with the channels in the shank and head to allow sliding of the head longitudinally of the shank, a pair of said channels in the head and bolt being formed with complemental longitudinally extending key grooves of substantially semi-circular cross-section, and a locking key having a cylindrical portion adapted to be inserted in said key grooves when in registration to prevent rotation of said head on the shank.

5. The combination of a bolt including a threaded shank having a pair of diametrically opposite longitudinally extending grooves formed therein the base of one of which is formed with a further groove of rounded cross-section and spaced from the edges of said base in which it is formed, a quick adjusting nut having its threaded bore provided with a pair of diametrically opposed longitudinally extending grooves the base of one of which is formed with a further groove adapted to register with said first-mentioned further groove in the bolt when said bolt and head are assembled, and a locking member of rounded cross-section adapted to be inserted in the said further grooves of the bolt and head to limit relative rotation of said bolt and head.

ELMER M. VAN DYKE.